United States Patent
Aronovich et al.

(10) Patent No.: US 9,471,620 B2
(45) Date of Patent: Oct. 18, 2016

(54) SUB-BLOCK PARTITIONING FOR HASH-BASED DEDUPLICATION

(71) Applicant: INTERNATIONAL BUSINESS MACHINES CORPORATION, Armonk, NY (US)

(72) Inventors: Lior Aronovich, Toronto (CA); Michael Hirsch, Mazkeret Batya (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/883,961

(22) Filed: Oct. 15, 2015

(65) Prior Publication Data

US 2016/0034523 A1 Feb. 4, 2016

Related U.S. Application Data

(63) Continuation of application No. 13/541,009, filed on Jul. 3, 2012, now Pat. No. 9,164,688.

(51) Int. Cl.
  *G06F 7/02* (2006.01)
  *G06F 17/30* (2006.01)
  *G06F 3/06* (2006.01)

(52) U.S. Cl.
  CPC ......... *G06F 17/30371* (2013.01); *G06F 3/067* (2013.01); *G06F 3/0608* (2013.01); *G06F 3/0641* (2013.01); *G06F 17/3033* (2013.01); *G06F 17/30156* (2013.01); *G06F 17/30159* (2013.01); *G06F 17/30424* (2013.01); *G06F 17/30864* (2013.01)

(58) Field of Classification Search
  None
  See application file for complete search history.

(56) References Cited

U.S. PATENT DOCUMENTS

| | | |
|---|---|---|
| 5,990,810 A | 11/1999 | Williams |
| 7,504,969 B2 | 3/2009 | Patterson et al. |
| 7,519,635 B1 | 4/2009 | Haustein et al. |
| 7,733,910 B2 | 6/2010 | Mace et al. |
| 7,844,581 B2 | 11/2010 | Dubnicki et al. |
| 7,933,939 B2 | 4/2011 | Williams |
| 7,979,491 B2 | 7/2011 | Lillibridge et al. |
| 7,979,584 B1 | 7/2011 | Li et al. |
| 8,108,353 B2 | 1/2012 | Balachandran et al. |
| 8,180,740 B1 | 5/2012 | Stager et al. |
| 2008/0013830 A1 | 1/2008 | Patterson et al. |
| 2008/0133561 A1 | 6/2008 | Dubnicki et al. |
| 2009/0276454 A1 | 11/2009 | Smith |
| 2010/0088296 A1 | 4/2010 | Periyagaram et al. |
| 2010/0094817 A1 | 4/2010 | Ben-Shaul et al. |
| 2010/0205163 A1 | 8/2010 | Eshghi et al. |
| 2011/0185133 A1 | 7/2011 | Reiter et al. |
| 2011/0238635 A1 | 9/2011 | Leppard |
| 2011/0258398 A1 | 10/2011 | Saliba et al. |
| 2013/0054544 A1 | 2/2013 | Li et al. |
| 2013/0091111 A1 | 4/2013 | Tofano |

FOREIGN PATENT DOCUMENTS

CN 102214210 A 10/2011

*Primary Examiner* — Bruce Moser
(74) *Attorney, Agent, or Firm* — Griffiths & Seaton PLLC

(57) ABSTRACT

Sub-block partitioning for hash-based deduplication is performed by defining a minimal size and maximum size of the sub-block. If one of a plurality of search criteria is satisfied by one of a plurality of hash values, declaring a position of the hash value as a boundary end position of the sub-block. If the maximum size of the sub-block is reached prior to satisfying one of the multiple search criteria, declaring a position of an alternative one of the hash values that is selected based upon another one of the multiple search criteria as the boundary end position of the sub-block. One of the plurality of search criteria is satisfied if n bits at predefined positions of a value calculated by applying an XOR operation on last calculated k hash values are equal to one of an mth predefined different patterns of bits.

24 Claims, 5 Drawing Sheets

SUB-BLOCK PARTITIONING FOR HASH-BASED DEDUPLICATION

CROSS-REFERENCE TO RELATED APPLICATIONS

This Application is a Continuation of U.S. patent application Ser. No. 13/541,009, filed on Jul. 3, 2012, the contents therein hereby incorporated by reference.

BACKGROUND OF THE INVENTION

1. Field of the Invention

The present invention relates in general to computers, and more particularly for improved sub-block partitioning for hash-based deduplication in a computing environment.

2. Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of the available data is copied again and again and forwarded without any change, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

Data deduplication refers to the reduction and/or elimination of redundant data. In data deduplication, a data object, which may be a file, a data stream, or some other form of data is broken down into one or more parts called sub-blocks. In a data deduplication process, duplicate copies of data are reduced or eliminated, leaving a minimal amount of redundant copies, or a single copy of the data, respectively. Using deduplication processes provides a variety of benefits, such as reduction of required storage capacity and increased network bandwidth. Due to these and other benefits, deduplication has emerged in recent years as a highly important technological field in computing storage systems.

Several approaches to deduplication have been proposed, many of which using hashing techniques. For example, in a hash-based duplication operation, data deduplication involves segmenting data into variable or fixed-sized sub-blocks, calculating the hash of each of the sub-blocks, and matching identical sub-blocks by their hashes.

A hash-based deduplication system should be able to provide an average sub-block size while maintaining a consistency in the sub-block size rather than experiencing sub-block sizes that significantly vary. Currently, hash-based deduplication systems are not able to provide an average sub-block size, while simultaneously maintaining a consistency in sub-block sizes. Thus, difficulties arise in handling sub-block size variations, which complicates storage and processing considerations. In other words, artificial minimum and maximum sub-block sizes complicates the storage and retrieval of sub-blocks and the sub-block's metadata in hash-based deduplication systems. The large and various distributions of sub-block sizes, along with the offsetting of the average sub-block size, reduce the efficiency of the balance between metadata (index and pointers) and data. Disruption in the reproducibility of sub-block boundaries reduces the ability of a deduplication system to identify identical sub-blocks vis-à-vis re-ordering of data, insertions, shifts and deletions in the data sequence.

Consequently, a hash-based deduplication system is needed that avoids artificial minimum and maximum sizes on sub-blocks that reduce the effect on the probability of finding valid sub-block boundaries, as well as reducing an offsetting effect on the average sub-block size, thereby breaking the fundamental property of reproducible sub-block boundaries. Therefore, the illustrated embodiments seek to provide defined minimum and maximum sub-block sizes (for convenient management of the data), and a tight distribution of sub-block sizes around a predictable average size (for predictability of storage and processing resources consumption), while producing reproducible and statistically significant sub-block boundaries (for effective sub-block matching and deduplication).

Accordingly, and in view of the foregoing, various exemplary method, system, and computer program product embodiments for improved sub-block partitioning for hash-based deduplication, in a computing environment, are provided. In one embodiment, by way of example only, a method comprises: defining a minimal size and maximum size of the sub-blocks; if one of a plurality of search criteria is not satisfied by one of a plurality of hash values, incrementing a current position of one of the plurality of hash values by at least one byte, and if the maximum size of the sub-block is not reached prior to satisfying one of the plurality of search criteria, calculating a next one of the plurality of hash values to test using the one of the plurality of search criteria; if one of the plurality of search criteria is satisfied by one of the plurality of hash values, declaring a position of the one of the plurality of hash values as a boundary position of the sub-block; if the maximum size of the sub-block is reached prior to satisfying one of the plurality of search criteria, declaring a position of an alternative one of the plurality of hash values that is selected based upon an alternative one of the plurality of search criteria as the boundary position of the sub-block; and satisfying one of the plurality of search criteria if n bits at predefined positions of a value calculated by applying an XOR operation on last calculated k hash values are equal to one of an mth predefined different patterns of bits, and applying one of a plurality of operations that combines values of the last calculated k hash values and produces alternative values whose statistical distribution being the same as the statistical distribution of the plurality of hash values being combined.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
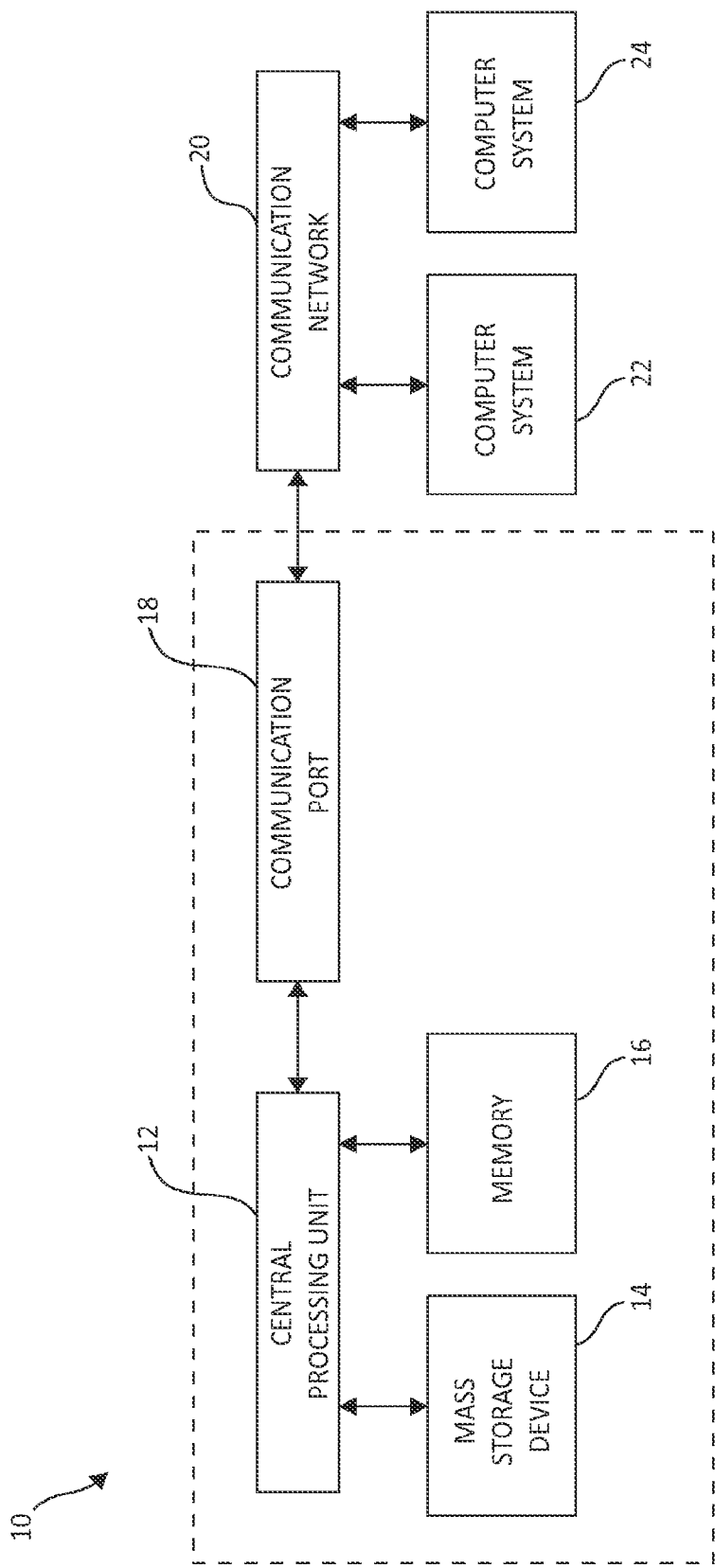
FIG. 1 is a block diagram illustrating a computing system environment having an example storage device in which aspects of the present invention may be realized.

As previously mentioned, hash-based duplication operations involve segmenting data into variable or fixed-sized sub-blocks, calculating the hash of each of the sub-blocks, and matching identical sub-blocks by their hashes. However, hash-based deduplication systems experience inefficiencies and productivity losses due to the large variation of sub-blocks sizes. Artificial minimum and maximum sizes on sub-blocks reduce the probability of finding valid sub-block boundaries, as well as reducing an offsetting effect on the average sub-block size. Moreover, the artificial minimum and maximum sizes on sub-blocks undermine the fundamental property of reproducible sub-block boundaries.

Therefore, the illustrated embodiments seek to provide defined minimum and maximum sub-block sizes (for convenient management of the data), and a tight distribution of sub-block sizes around a predictable average size (for predictability of storage and processing resources consumption), while producing reproducible and statistically significant sub-block boundaries (for effective sub-block matching and deduplication).

Accordingly, in one embodiment, by way of example only, minimum and maximum sub-block sizes are defined for a sub-block. For each boundary start point of a sub-block (which is either the start of the block or the byte following the previous sub-block end point), the search for a boundary position (e.g., the boundary end point of the current sub-block) starts after the defined minimum sub-block size. This both guarantees the minimal sub-block size, and saves processing resources (by calculating fewer hash values). The search for a boundary position proceeds until satisfying the search criteria or reaching the maximal sub-block size. In other words, for each boundary start position of the sub-block, starting a search, after the minimal size of the sub-block, for locating a boundary position of a subsequent sub-block by using multiple search criteria to test individual hash values that are calculated during the search on each byte position and/or derived hash values that are derived from sets of underlying hash values. If one of the multiple search criteria is satisfied by one of the individual hash values and/or derived hash values, declaring the position of the hash value as a boundary end position of the sub-block. If the maximum size of the sub-block is reached prior to satisfying one of the multiple search criteria, declaring a position of an alternative one of the hash values, that is selected, based upon another one of the multiple search criteria, as the boundary end position of the sub-block. Thus, the illustrated embodiments guarantee finding a reproducible boundary position in the searched data interval between the defined minimum and maximum sub-block sizes.

The multiple search criteria, used during the search interval, include at least three types: (1) Criteria considering the last calculated hash value, (2) Criteria considering a subset of the already calculated hash values, and (3) Criteria considering all the hash values calculated in the search interval (between the minimum and the maximum sub-block sizes). By defining a set of criteria from the multiple criteria described above, which are applied together during the search interval, two beneficial effects are achieved. (1) The probability of finding a boundary position satisfying the criteria before reaching the maximal sub-block size can be controlled and sufficiently increased. (2) A reproducible boundary position is guaranteed to be found during the search interval between the defined minimum and maximum sub-block sizes. The reason being for the guarantee is that if a point satisfying the criteria of types (1) and (2) is not found, the criteria of type (3) is guaranteed to produce a reproducible boundary position.

In addition, the illustrated embodiments provide the following benefits: (1) A minimum and maximum sub-block sizes are provided, (2) A tight distribution of sub-block sizes around a predictable average sub-block size is achieved, (3) Reproducible and statistically significant sub-block boundaries are realized, and (4) Resource processing is conserved by calculating a fewer hash values. These attributes facilitate achieving effective sub-block identity matching and deduplication by using predictable and controllable storage and processing resources.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
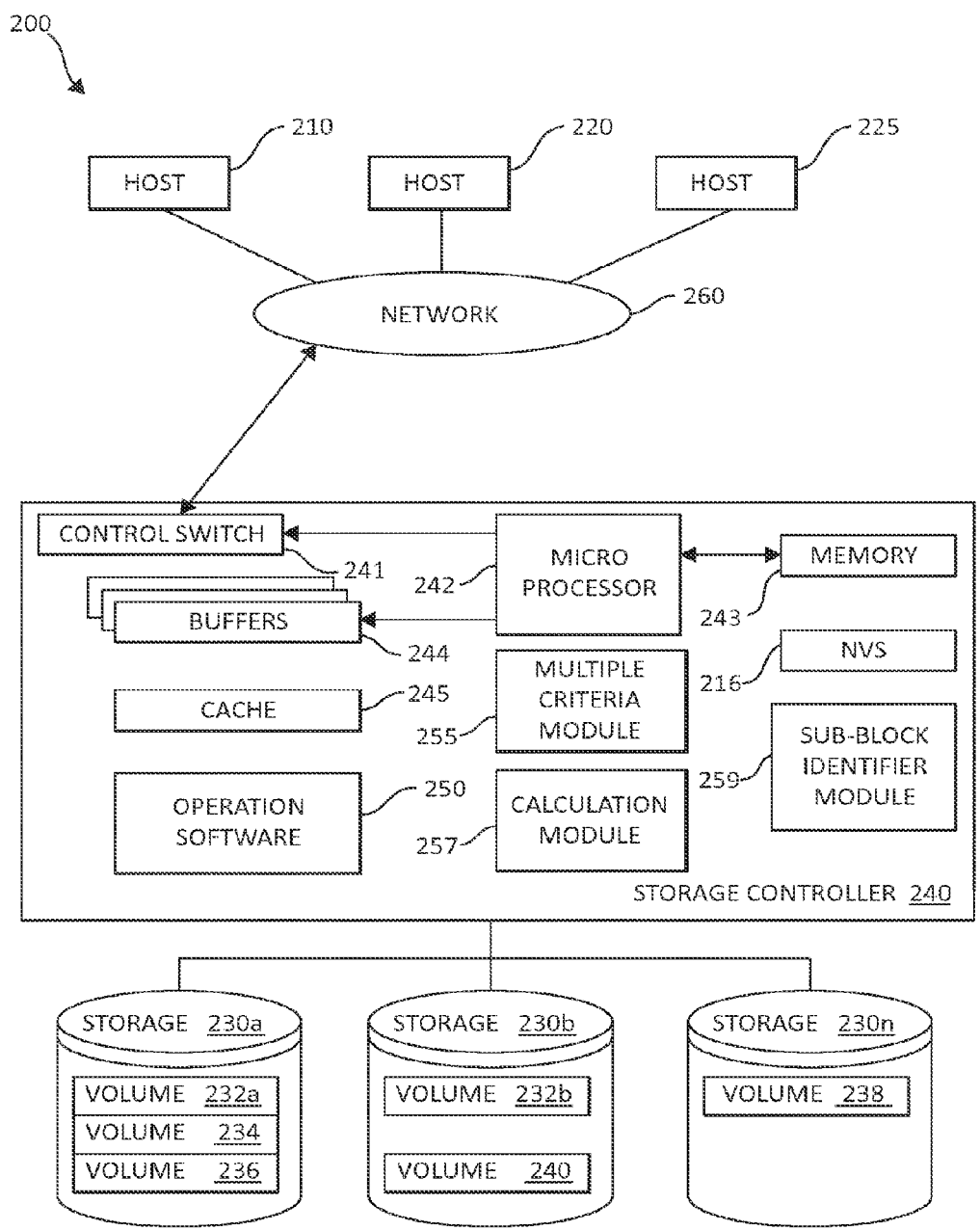
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a multiple criteria module 255, a hash value calculation module 257, and a sub-block identifier module 259. The multiple criteria module 255, the hash value calculation module 257, and the sub-block identifier module 259 may work in conjunction with each and every component of the storage controller 240, the hosts 210, 220, 225, and storage devices 230. The multiple criteria module 255, the hash value calculation module 257, and the sub-block identifier module 259 may be structurally one complete module or may be associated and/or included with other individual modules. The multiple criteria module 255, the hash value calculation module 257, and the sub-block identifier module 259 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the multiple criteria module 255, the hash value calculation module 257, and the sub-block identifier module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, multiple criteria module 255, the hash value calculation module 257, and the sub-block identifier module 259 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the multiple criteria module 255, the hash value calculation module 257, and the sub-block identifier module 259 may also be located in the cache 245 or other components. As such, one or more of the multiple criteria module 255, the hash value calculation module 257, and the sub-block identifier module 259 maybe used as needed, based upon the storage architecture and users preferences.

As will be described below in FIGS. 3-5, searching for the next sub-block boundary begins at either the defined minimum sub-block size, from the start of the block, and/or from a byte following the preceding sub-block's boundary end point. From this starting point, a rolling hash function is used to generate hash values at every byte position during a search interval. The generation of the hash values at every byte position continues until the one of the multiple search criteria is satisfied, or in the alternative, the maximum sub-block size is reached.

The multiple search criteria are to be used during the searched data interval for a boundary position. The multiple search criteria include at least three types. For criteria of type (1), the criteria considers the last calculated hash value and is satisfied if the lower 'n' bits of the last calculated hash value are equal to one of 'm' predefined different patterns of bits. The search criteria of search type (1) may also be satisfied if higher n bits, or any combination of n bits in fixed positions are equal to one of 'm' predefined different patterns of bits.

The number 'n' is of significance. A higher value of n increases the size of the space of (random) bit patterns for the search, and thus, increases the statistical significance of the boundary positions, and increases the size of the search interval required in order to achieve a specific value of probability for finding a boundary position within the search interval. The number 'm' is of significance as well. A lower value of m, reduces the probability of finding a boundary position for any given hash value, and increases the statistical significance of the boundary positions.

For criteria of type (2), the criteria considers a subset of the already calculated hash values, and is satisfied if the lower 'n' bits of a value calculated by applying a bitwise XOR operation on the last 'k' calculated hash values, are equal to one of 'm' predefined different patterns of bits. As before, the higher n bits, or any combination of n bits in fixed positions of a value calculated by applying a bitwise XOR operation on the last 'k' calculated hash values, that are equal to one of 'm' predefined different patterns of bits, may be considered. Further, any other operation for combining the values of the last k calculated hash values, which produces values whose statistical distribution is similar to the statistical distribution of the underlying hash values being combined, is applicable.

If for a certain hash value, one of the criteria of types (1) and (2) is satisfied, then the position of this certain hash value is selected to be a boundary position of the current sub-block, and the procedure then proceeds to calculate a boundary position for the next sub-block. If the search reaches the maximum sub-block size, and neither one of the criteria of types (1) and (2) were satisfied, then a criteria of type (3) becomes satisfied.

For criteria of type (3), all the hash values calculated in the search interval (between the minimum and the maximum sub-block sizes) are considered and the criteria may be satisfied by selecting a boundary position from the said hash values. In one embodiment, the criteria of type (3) may be satisfied by selecting the hash value with the maximal value, and then selecting the position of that hash value to be a boundary position. In other embodiments, the hash value with the minimal value may be selected, and/or any other linearly calculated selection can be applied (e.g., selecting the 2nd largest or smallest value). Furthermore, the positions range of the hash values considered as input for a selection method may be a subset of the entire available range, in order to obtain specific statistical properties of the selected boundary positions. In one embodiment, defining the range of positions of the hash values considered as input for a selection method, to be from the position of the minimal sub-block size to the position farther from the said position by a given size 'd' multiplied by 2, enables the mean size of a sub-block calculated using this selection method to be the minimal sub-block size added by 'd'.

Figure 3:
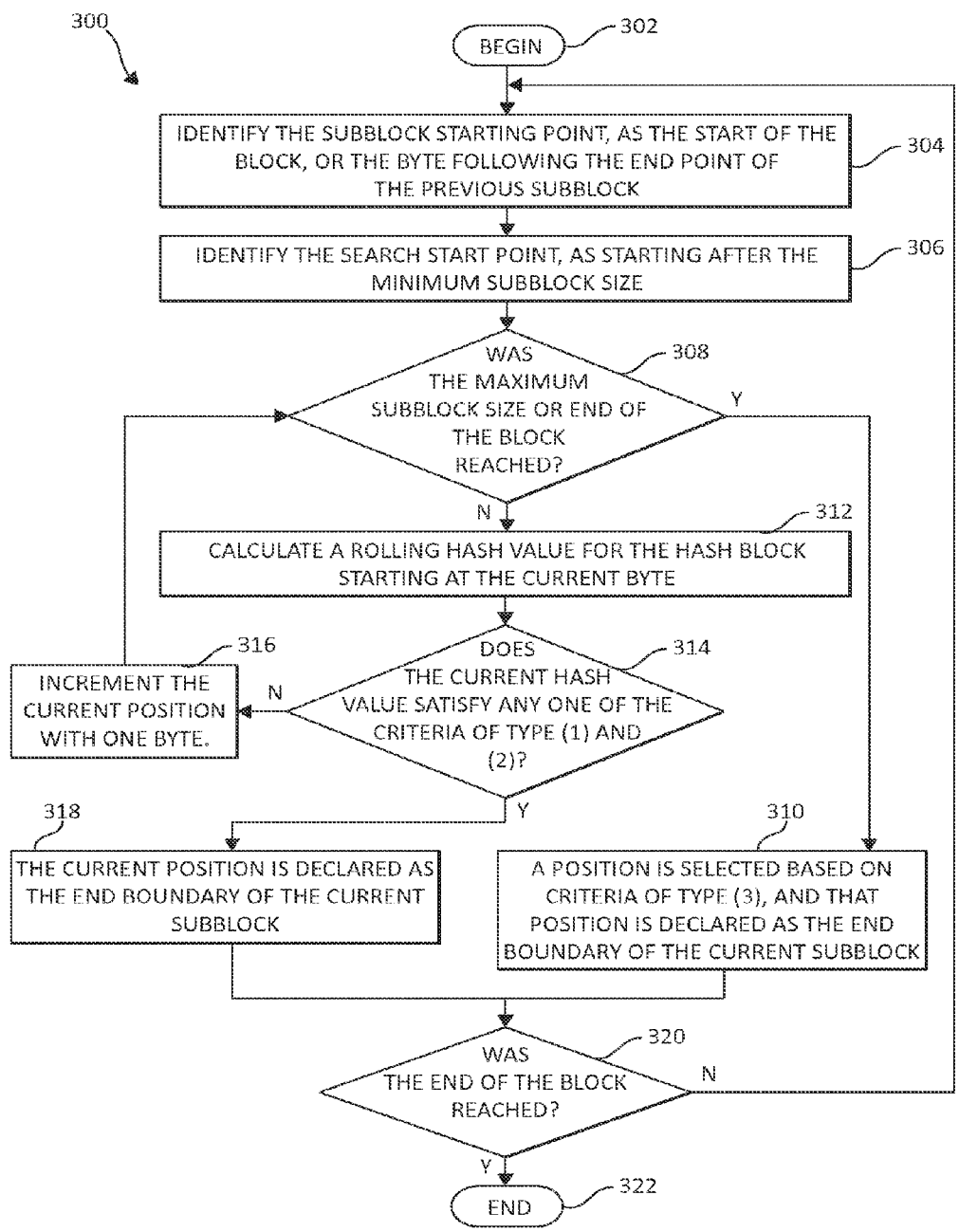
FIG. 3 is a flowchart illustrating an exemplary method for improved sub-block partitioning for hash-based deduplication.

FIG. 3 is a flowchart illustrating an exemplary method for improved sub-block partitioning for hash-based deduplication. The method 300 begins processing (step 302) by identifying the sub-block starting point as either the start of the block or the byte following the end point of the previous block (step 304). The method 300 identifies the search start point as the point starting after the minimum sub-block size (step 306). The method 300 determines if the maximum sub-block size and/or the end of the block has been reached (step 308). If yes, a position is selected based on the criteria of type three (3), as described above, and the position that is selected is declared as the boundary end of the current sub-block (step 310). If the maximum sub-block size and/or the end of the block are not reached, the method 300 calculates a rolling hash value for the hash block starting at the current byte (step 312). The method 300 determines if the current hash value satisfies any one of the criteria of type one (1) and/or criteria of type two (2) (step 314). If no, the method 300 increments the current position with one byte (step 316) and returns to step 308. If yes, the current position (e.g., current position of the search) is declared as a boundary of the current sub-block (step 318) and then the method determines if the end of the block was reached (step 320). If no, the method 300 returns to step 304, for identifying the sub-block starting point as the start of the block or the byte following the end point of the previous block. If the end of the block is reached, the method 300 ends processing (step 322).

Figure 4:
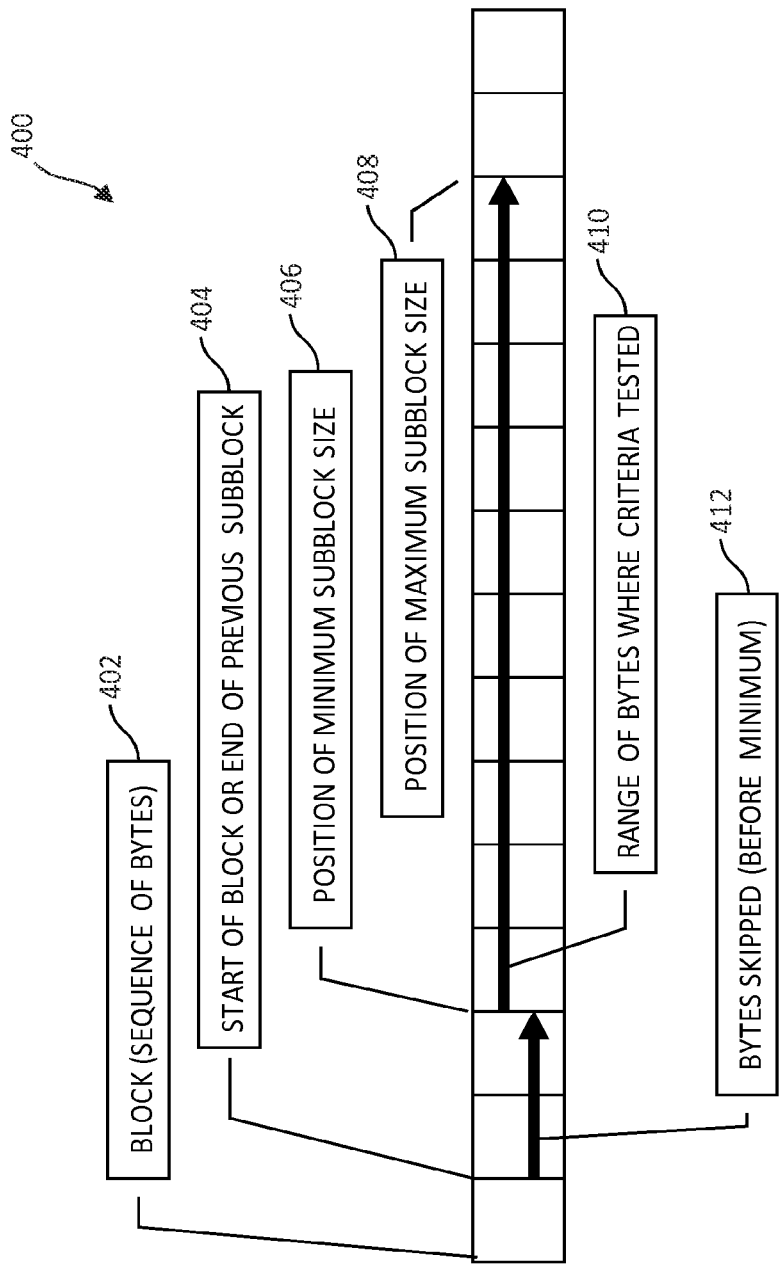
FIG. 4 is a block diagram illustrating exemplary sub-block definitions in a computer system in which aspects of the present invention may be realized.

Turning now to FIG. 4, a block diagram illustrating exemplary sub-block definitions in a computer system is depicted. As illustrated, by way of example only, the block diagram depicts a block (sequence of bytes) 402, which is the first block in a string of blocks. The start of block or the end of previous sub-block 404 is also shown, as illustrated in FIG. 3, where the sub-block starting point is identified as the start of the block or the byte following the end point of the previous block the position of minimum sub-block. The position of the maximum sub-block size 408 is also defined and identified. A range of bytes 410 where the criteria are tested from the hash values, which are calculated from a rolling hash function for every byte position in the range of bytes, is shown to illustrate the search interval, as described above in FIG. 3. Prior to the range of bytes, that are used to test the criteria, are the bytes that may be skipped (before minimum) 412. The skipped bytes 412 are those bytes that may exist between the start of a block or end of a previous sub-block 404 and the defined position of the minimum sub-block size 408.

Figure 5A:
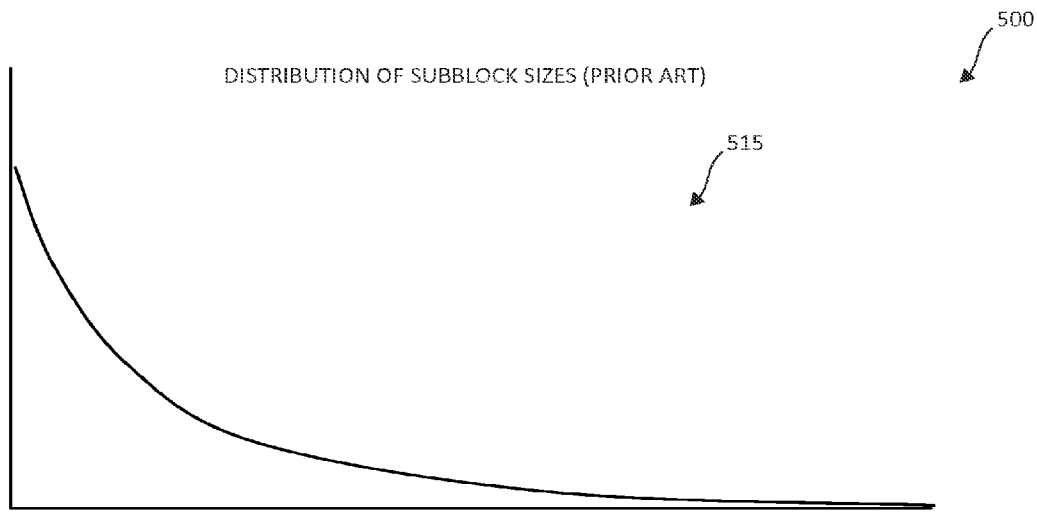
FIG. 5A is a diagram illustrating a distribution of sub-block sizes (Prior Art)
Figure 5B:
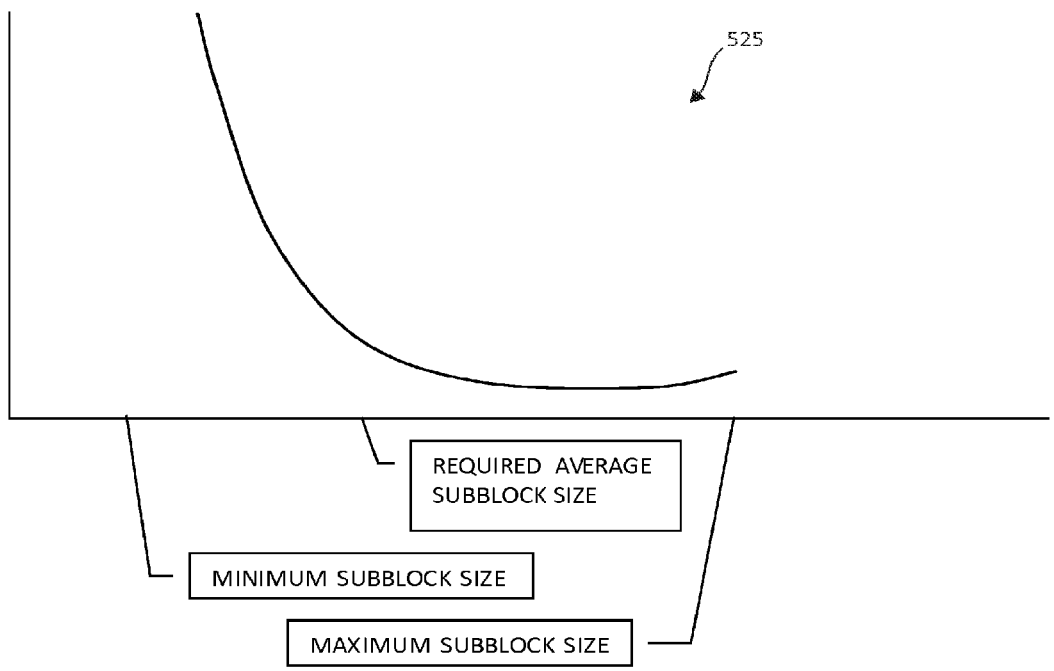
FIG. 5B is a diagram illustrating an exemplary distribution of sub-block sizes (Present Invention).

FIG. 5A is a diagram illustrating an exemplary distribution of sub-block sizes 515 (Prior Art). FIG. 5B is a diagram illustrating an exemplary distribution of sub-block sizes 525 (Present Invention). As seen in FIG. 5A, the statistical distribution of the sub-blocks using the prior art techniques are illustrated for comparison against the statistical distribution of the sub-block sizes using the techniques of the illustrated embodiments as illustrated in FIG. 5B 525. As seen in FIG. 5B, the techniques of the illustrated embodiments 525 enable to control the minimal, maximal and average sub-block sizes, as well as the deviation of the sizes.

Based upon the foregoing, the illustrated embodiments provide a hash based deduplication algorithm, where calculating the boundaries of the sub-blocks includes the following. First, minimal and maximal sub-block sizes are defined and guaranteed. For each start position of a sub-block, starting the boundary search after the defined minimal size and using multiple criteria to test each hash value, or each set of hash values, during the search. If one of the multiple criteria (e.g., criteria type (1) and/or criteria type (2)) is satisfied, then the position of the hash value satisfying one of the multiple criteria is declared as a boundary position of the current sub-block.

Furthermore, if the maximal sub-block size is reached, and/or the end of the block is reached, a hash value is selected from the set of hash values calculated during the search. The selected hash value's position is declared as a boundary position of the current sub-block.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

What is claimed is:

1. A method for sub-block partitioning for hash-based deduplication by a processor device in a computing environment, the method comprising:
    defining a minimal size and maximum size of the sub-blocks;
    for each boundary start position of a sub-block, starting a search for the boundary position of the sub-block after the minimal size of the sub-block;
    if one of a plurality of search criteria is not satisfied by one of a plurality of hash values, incrementing a current position of one of the plurality of hash values by at least one byte, and if the maximum size of the sub-block is not reached prior to satisfying one of the plurality of search criteria, calculating a next one of the plurality of hash values to test using the one of the plurality of search criteria;
    if one of the plurality of search criteria is satisfied by one of the plurality of hash values, declaring a position of the one of the plurality of hash values as a boundary position of the sub-block;
    if the maximum size of the sub-block is reached prior to satisfying one of the plurality of search criteria, declaring a position of an alternative one of the plurality of hash values that is selected based upon an alternative one of the plurality of search criteria as the boundary position of the sub-block; and
    satisfying one of the plurality of search criteria if n bits at predefined positions of a value calculated by applying an XOR operation on last calculated k hash values are equal to one of an mth predefined different patterns of bits, and applying one of a plurality of operations that combines values of the last calculated k hash values and produces alternative values whose statistical distribution being the same as the statistical distribution of the plurality of hash values being combined.

2. The method of claim 1, further including, using the plurality of search criteria to test the plurality of hash values that are generated during the search, wherein the plurality of hash values includes at least individual hash values and derived hash values that are derived from sets of underlying hash values.

3. The method of claim 1, wherein the one of the plurality of search criteria includes one of a first type search criteria and a second type search criteria, and the alternative one of the plurality of search criteria is a third type search criteria, and further wherein the first type search criteria is satisfied if n bits at predefined positions of a last calculated hash value are equal to one of an mth predefined different patterns of bits.

4. The method of claim 1, further including in the plurality of hash values a minimum hash value, a maximum hash value, a last calculated hash value, and last calculated k hash values.

5. The method of claim 1, further including identifying the boundary start position as one of a start of a block, a last selected boundary position, and one or more bytes following a last identified boundary end position.

6. The method of claim 3, further including satisfying the third type search criteria by selecting a boundary position of the sub-block by selecting one of the plurality of hash values that are calculated during the search by at least one of:
    selecting the maximum hash value,
    selecting the minimum hash value, and
    selecting an nth largest or a smallest hash value.

7. The method of claim 6, further including providing a range of predefined positions of the plurality of hash values that are considered as input for a selection method, wherein the range of predefined positions is a subset of an entire available range for predefined positions.

8. The method of claim 1, further including using a rolling hash function to calculate the individual hash values at every byte position.

9. A system for sub-block partitioning for hash-based deduplication in a computing environment, comprising:
    a processor device, operable in the computing environment, wherein the processor device:
        defines a minimal size and maximum size of the sub-block,
        for each boundary start position of a sub-block, starts a search for the boundary position of the sub-block after the minimal size of the sub-block,
        if one of a plurality of search criteria is not satisfied by one of a plurality of hash values, increments a current position of one of the plurality of hash values by at least one byte, and if the maximum size of the sub-block is not reached prior to satisfying one of the plurality of search criteria, calculating a next one of the plurality of hash values to test using the one of the plurality of search criteria,
        if one of the plurality of search criteria is satisfied by one of the plurality of hash values, declares a position of the one of the plurality of hash values as a boundary position of the sub-block,
        if the maximum size of the sub-block is reached prior to satisfying one of the plurality of search criteria, declares a position of an alternative one of the plurality of hash values that is selected based upon an alternative one of the plurality of search criteria as the boundary position of the sub-block, and
        satisfies one of the plurality of search criteria if n bits at predefined positions of a value calculated by applying a XOR operation on last calculated k hash values are equal to one of an mth predefined different patterns of bits, and applying one of a plurality of operations that combines values of the last calculated k hash values and produces alternative values whose statistical distribution being the same as the statistical distribution of the plurality of hash values being combined.

10. The system of claim 9, wherein the processor device, using the plurality of search criteria to test the plurality of hash values that are generated during the search, wherein the plurality of hash values includes at least an individual hash value and derived hash values that are derived from sets of underlying hash values.

11. The system of claim 9, wherein the one of the plurality of search criteria includes one of a first type search criteria and a second type search criteria, and the alternative one of the plurality of search criteria is a third type search criteria, further wherein the processor device satisfies the first type search criteria if n bits at predefined positions of a last calculated hash value are equal to one of an mth predefined different patterns of bits.

12. The system of claim 9, wherein the processor device includes in the plurality of hash values a minimum hash value, a maximum hash value, a last calculated hash value, and last calculated k hash values.

13. The system of claim 9, wherein the processor device identifies the boundary start position as one of a start of a block, a last selected boundary position, and one or more bytes following a last identified boundary end position.

14. The system of claim 11, wherein the processor device satisfies the third type search criteria by selecting a boundary position of the sub-block by selecting one of the plurality of hash values that are calculated during the search by at least one of:
    selecting the maximum hash value,
    selecting the minimum hash value, and
    selecting an nth largest or a smallest hash value.

15. The system of claim 14, wherein the processor device provides a range of predefined positions of the plurality of hash values that are considered as input for a selection method, wherein the range of predefined positions is a subset of an entire available range for predefined positions.

16. The system of claim 9, wherein the processor device uses a rolling hash function to calculate the individual hash values at every byte position.

17. A computer program product for sub-block partitioning for hash-based deduplication by a processor device, the computer program product embodied on a non-transitory computer-readable storage medium having computer-readable program code portions stored therein, the computer-readable program code portions comprising:
    a first executable portion for defining a minimal size and maximum size of the sub-block and starting a search for a boundary position of the sub-block after the minimal size of the sub-block;
    a second executable portion for, if one of a plurality of search criteria is not satisfied by one of a plurality of hash values, incrementing a current position of one of the plurality of hash values by at least one byte, and if the maximum size of the sub-block is not reached prior to satisfying one of the plurality of search criteria, calculating a next one of the plurality of hash values to test using the one of the plurality of search criteria;
    a third executable portion for, if one of the plurality of search criteria is satisfied by one of the plurality of hash values, declaring a position of the one of the plurality of hash values as a boundary position of the sub-block;
    a fourth executable portion for, if the maximum size of the sub-block is reached prior to satisfying one of the plurality of search criteria, declaring a position of an alternative one of the plurality of hash values that is selected based upon an alternative one of the plurality of search criteria as the boundary position of the sub-block; and
    a fifth executable portion for satisfying the second type search criteria if n bits at predefined positions of a value calculated by applying a XOR operation on last calculated k hash values are equal to one of an mth predefined different patterns of bits, and applying one of a plurality of operations that combines values of the last calculated k hash values and produces alternative values whose statistical distribution being the same as the statistical distribution of the plurality of hash values being combined.

18. The computer program product of claim 17, further including, for each boundary start position of a sub-block, a sixth executable portion for using the plurality of search criteria to test the plurality of hash values that are generated during the search, wherein the plurality of hash values includes at least an individual hash value and derived hash values that are derived from sets of underlying hash values.

19. The computer program product of claim 17, wherein the one of the plurality of search criteria includes one of a first type search criteria and a second type search criteria, and the alternative one of the plurality of search criteria is a third type search criteria, and further including satisfying the first type search criteria if n bits at predefined positions of a last calculated hash value are equal to one of an mth predefined different patterns of bits.

20. The computer program product of claim 17, further including a sixth executable portion for including in the plurality of hash values that are calculated during the search a minimum hash value, a maximum hash value, a last calculated hash value, and last calculated k hash values.

21. The computer program product of claim 17, further including a sixth executable portion for identifying the boundary start position as one of a start of a block, a last selected boundary position, and one or more bytes following a last identified boundary end position.

22. The computer program product of claim 19, further including a sixth executable portion for satisfying the third type search criteria by selecting a boundary position of the sub-block by selecting one of the plurality of hash values that are calculated during the search by at least one of:
    selecting the maximum hash value,
    selecting the minimum hash value, and
    selecting an nth largest or a smallest hash value.

23. The computer program product of claim 22, further including a seventh executable portion for providing a range of predefined positions of the plurality of hash values that are considered as input for a selection method, wherein the range of predefined positions is a subset of an entire available range for predefined positions.

24. The computer program product of claim 17, further including a sixth executable portion for using a rolling hash function to calculate the individual hash values at every byte position.

* * * * *